United States Patent
Blair

[15] 3,656,136
[45] Apr. 11, 1972

[54] ELECTRIC MOTOR WITH SAFETY SENSING DEVICE

[72] Inventor: Darrell J. Blair, Ventura County, Calif.

[73] Assignee: M. & B. Electric Co. Inc.

[22] Filed: July 30, 1970

[21] Appl. No.: 59,486

[52] U.S. Cl. ............................340/253 R, 340/255, 324/51, 317/18
[51] Int. Cl. ......................................................G08b 21/00
[58] Field of Search......................340/255, 253 R; 317/18 R; 324/51

[56] References Cited

UNITED STATES PATENTS

| 2,275,883 | 3/1942 | Bany | 340/255 |
| 3,176,219 | 3/1965 | Behr | 340/255 X |

Primary Examiner—John W. Caldwell
Assistant Examiner—Michael Slobasky
Attorney—Pastoriza and Kelly

[57] ABSTRACT

A sensing device is connected to one of the winding terminals of an electric motor and a measure of the winding resistance is effectively determined by the value of current flowing through the terminal. If the winding resistance is too low for safe operation of the motor as might result from moisture in the motor, a control signal is generated by the sensing means which in turn will operate an indicating device to advise operators not to apply the main power source to the motor. The same control signal may be utilized to open a switch in the main powerline and thus prevent application of power of the motor until such time as the motor is in a safe condition for operation.

1 Claims, 2 Drawing Figures

INVENTOR.
DARRELL J. BLAIR
BY Pastoriza & Kelly
ATTORNEYS

ELECTRIC MOTOR WITH SAFETY SENSING DEVICE

This invention relates generally to electric motors and more particularly to large electrical power motors in combination with a safety sensing device for preventing application of power to the motor if it is in an unsafe condition for operation.

BACKGROUND OF THE INVENTION:

In large industrial type electric motors such as used for driving oil pumps, irrigation pumps and the like certain conditions arise which makes it unsafe to operate the motor. The motors in question generally range from 10 to 30 horsepower and are often located in an environment in which moisture can collect within the motor when it is shut down. The presence of such moisture on a cold motor seriously reduces the resistance of the windings so that if full electrical power is applied all of a sudden, damage to the motor can occur.

In addition to the foregoing, the windings of the motor itself may become impaired as could occur if adjacent turns short circuit as a result of insulation wear. In this event the resistance of the windings is lowered and full application of starting power can damage the motor.

It would be desirable to provide some type of device in combination with such industrial type motors capable of indicating whether or not the motor was in a safe condition before the main power source is connected to the motor. With such a device, serious damage to a motor which might temporarily be in an unsafe condition such as can result from the collection of moisture, could be avoided.

BRIEF DESCRIPTION OF THE PRESENT INVENTION:

With the foregoing in mind, the present invention contemplates a simple sensing device in combination with a motor for providing an indication of whether or not the motor is in a safe condition for application of full power.

In accord with the invention, the sensing device includes an auxiliary source of electrical energy and is connected to one of the motor winding terminals. A small current is passed through the terminal and if the value of this current is more than a given adjusted value it is known that the resistance of the winding is lower than would be safe for applying full power to the motor. A suitable control signal is generated in response to the current and this control signal can be utilized to indicate either an unsafe condition or a safe condition depending upon the value of the current. An operator will then be advised as to whether or not it is safe to apply full power to the motor.

A further feature of the invention contemplates actually opening the power circuit to the motor by operating suitable switch means in response to the control signal developed in the sensing means. By this arrangement, it will not be possible to start the motor until its unsafe condition is corrected.

BRIEF DESCRIPTION OF THE DRAWINGS

A better understanding of the invention will be had by now refering to one embodiment thereof as illustrated in the accompanying drawings, in which.

Figure 1:
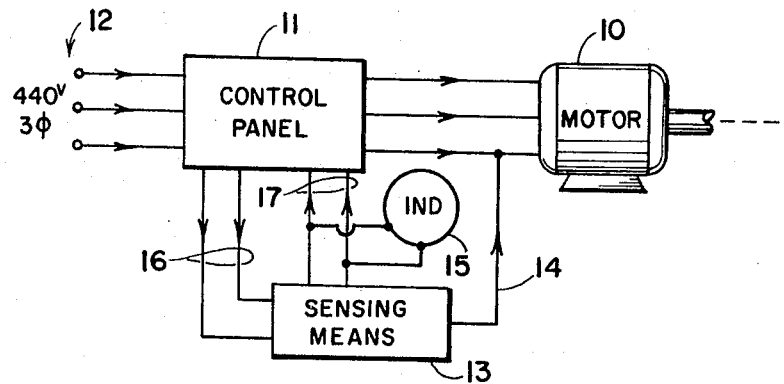
FIG. 1 is a simple block diagram of an industrial type motor in combination with the sensing device of the present invention; and, FIG. 2 is a more detailed circuit diagram useful in explaining the operation of the invention.

DETAILED DESCRIPTION OF THE INVENTION:

Referring to FIG. 1, there is shown an industrial motor 10 to which a main source of electrical energy may be supplied through a control panel 11 receiving power at input terminals 12. Normally, the source of electrical energy will be 440 volt three-phase power. In accord with the invention, there is provided in combination with the motor a sensing means 13 connected as by a sensing lead 14 to one of the windings of the motor 10. An indicator which may comprise either an audio or visual signal 15 connects to the sensing means as shown.

Auxiliary power for operating the sensing means may be derived from the main power leads in the control panel 11 as indicated by the lines 16. Branch output leads 17 in parallel from the connections to the indicator 15 may pass into the control panel to open the circuit to the motor in response to operation of the sensing means.

Figure 2:
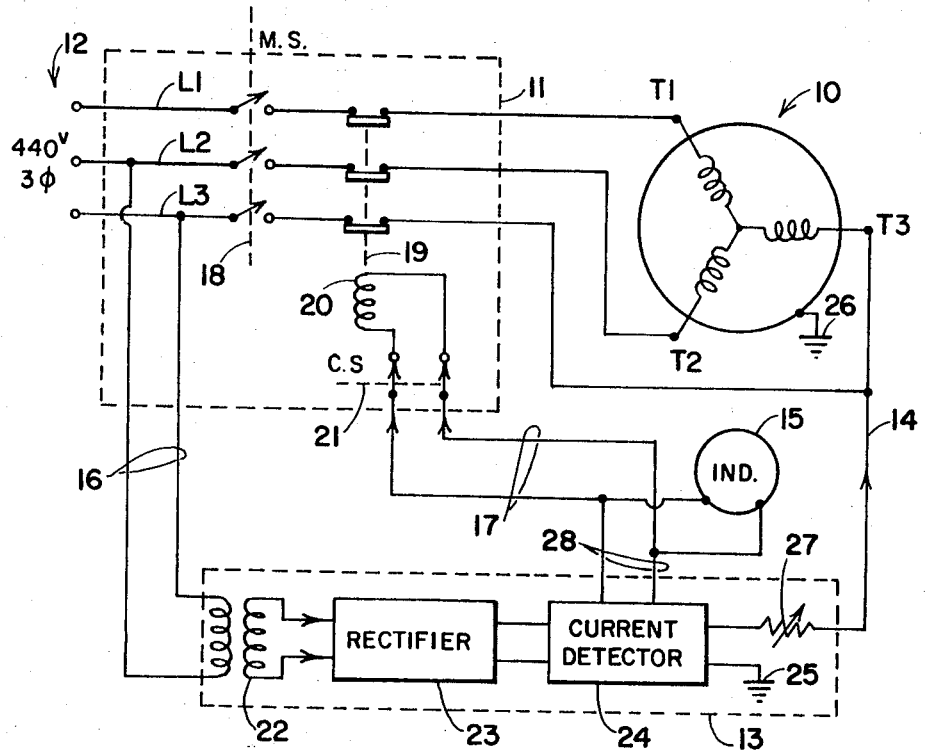

Referring now to FIG. 2, further details of the circuit connections will be described. As shown, the input main power source 12 connects through lines L1, L2, and L3 to terminals T1, T2 and T3 respectively for the motor windings of the motor 10. A main switch or master switch M.S. also designated by the numeral 18 is provided in the various lines within the control panel 11. This main switch may be manually operated to apply full power to the motor 10 when closed.

In accord with a feature of the present invention there is also included a further control switch 19 operable by a relay 20 in the main powerlines. The relay 20 in turn connects to the leads 17 from the sensing means through a control switch 21.

Referring to the lower left portion of FIG. 2, auxiliary power for the sensing means is derived by leads 16 from any two of the three lines. This energy passes through transformer 22 and is thence rectified by a rectifier 23 to provide a source of DC current. This current passes through a current detector 24 and thence to the line 14 connected to the terminal T3 of the motor 10. A reference ground 25 is provided in the current detector and this reference ground corresponds to a ground 26 for the chassis or casing of the motor 10.

The circuit is completed by providing a variable resistor 27 in the sensing line 14 which enables adjustment of current into this line passed through the terminal T3.

OPERATION

With specific reference to FIG. 2, assume first that the sensing means 13, associated indicator 15 and control switch 19 are not in the circuit. In this event, the motor 10 may be started or stoped at will by throwing the master switch 18 between its closed and opened positions. Should any moisture have accumulated in the motor during a period when it was not operating, the resistance between the windings and ground may have been reduced to an extent that full application of power could seriously damage the motor. In other instances, should the motor include defective coils in its windings which would result in a reduced resistance or should there be other types of short circuits, full application of power to the motor would also result in serious damage.

The sensing means in accord with this invention in combination with the motor will prevent inadvertent application of power to the motor when it is in an unsafe condition.

Thus, considering now the sensing means as being connected into the circuit as shown in FIG. 2, the auxiliary power derived through the line 16, transformer 22, and rectifier 23 generates a small current which is passed by the current detector through the variable resistance 27 and sensing lead 14 to one of the terminals for the windings of the motor 10. In the example chosen for illustrative purposes, the terminal T3 is selected. The current detector 24 itself includes any suitable means for generating a control signal in response to a certain value of current existing in the sensing line 14. For example, if the current in the line 14 is extremely small; that is, falls below some given value as might result if the resistance of the winding T3 is at a proper value, a signal could be generated which would actuate the indicator 15 to advise personnel that the motor was in a safe condition to apply power. In this case, the same signal could be used to energize a relay coil 20 and close the control switch 19 as shown in its solid line position, this control switch under such circumstances normally being open. The operator could throw the master switch 18 and apply full power to the motor knowing that it is in a safe condition.

In the event that moisture had collected in the motor resulting in a lowered resistance in the windings, then the current flow in the sensing line 14 would be increased beyond the given value and the indicating means 15 de-energized along with the relay coil 20 to open the control switch 19. Lack of an indication would thus advise the operator that the motor was in an unsafe condition. In fact, with the control switch 19 and relay 20 as a part of the circuit, it would not be possible for the operator to apply full power to the motor. It should be understood, however that the provision of the control switch 19 and associated relay is merely an optional feature, the indicator 15 itself being sufficient in many cases to advise the operator whether to apply power or not.

Alternatively, the current detector could generate a control signal only if the current in the line 14 is greater than some predetermined value thereby indicating a lowered resistance in the winding. In this event, the control signal would energize the indicator 15 and a suitable audible or visual signal would be provided showing that the motor was in an unsafe condition to operate. If the control switch 21 is closed to include the relay 20 and associated control switch 19 in the circuit, the presence of the control signal would open the control switch which would be a normally closed switch thereby preventing application of power to the motor 10.

In order to provide fail-safe conditions, it would be preferable to have the control signal generated only in response to current in the sensing line 14 being less than some given value so that a positive indication is provided by the indicator 15 advising the operator that the motor is in a safe condition to apply full power. It should be understood, however, that either arrangement falls within the scope of the present invention.

The specific circuit in the current detector 24 for generating the control signal in response to a value of current in the sensing line 14 may take any of many available forms clearly known to those skilled in the art. Thus, a voltage will be present dependent upon the current flow in the sensing line 14 which voltage may be used to trigger a transistor between an off and on condition depending upon the value of the voltage. Adjustment of the particular value of current for causing a control signal to be generated can be effected by the variable resistance 27 which in affect varies the total resistance between the detector and ground through the winding connected to the terminal T3. The same adjustment can be utilized to adapt the device to motors having different winding characteristics.

From the foregoing description, it will thus be evident that the present invention has provided a simple and reliable sensing device for use in combination with industrial type motors wherein various hazards heretofore associated with the operation of such motors can readily be overcome.

What is claimed is:

1. An electric motor having multiple windings; motor terminals on said windings; a control panel for connecting a main power source of a.c. electrical energy to said motor terminals; sensing means including an auxiliary source of electrical energy derived from said main power source and including a transformer and rectifying means, said sensing means being connected to one terminal of said motor terminals when said motor is disconnected from said main power source and responsive to a given current flow through said one terminal to generate a control signal in accordance with the resistance value of the windings connected to said one terminal; indicating means responsive to said control signal for advising operating personnel whether or not said motor is in a safe condition to apply the main power source to said motor; and control switch means between said main power source and said terminals including a relay responsive to said control signal to connect or disconnect said main power source to said motor terminals depending respectively on whether the resistance of said windings is such that said motor is in a safe or unsafe condition for operation, said sensing means including a current control means enabling adjustment of said given value of current for a given resistance value of said windings so that said sensing means can operate in combination with motors of different winding characteristics.

* * * * *